(12) United States Patent
Smith et al.

(10) Patent No.: US 11,435,165 B2
(45) Date of Patent: Sep. 6, 2022

(54) NARROW BAND ANTENNA HARMONICS FOR GUIDANCE IN MULTIPLE FREQUENCY BANDS

(71) Applicant: BAE SYSTEMS Information and Electronic Systems Integration Inc., Nashua, NH (US)

(72) Inventors: Brian J. Smith, Nashua, NH (US); Matthew F. Chrobak, Groton, MA (US); Peter Dusaitis, Manchester, NH (US); Paul D. Zemany, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 20 days.

(21) Appl. No.: 17/112,012

(22) Filed: Dec. 4, 2020

(65) Prior Publication Data
US 2022/0178659 A1 Jun. 9, 2022

(51) Int. Cl.
*F41G 7/22* (2006.01)
*G08C 17/02* (2006.01)
*G01S 13/42* (2006.01)
*G01S 13/58* (2006.01)

(52) U.S. Cl.
CPC ............ *F41G 7/2286* (2013.01); *G08C 17/02* (2013.01); *G01S 13/42* (2013.01); *G01S 13/58* (2013.01)

(58) Field of Classification Search
CPC ..... F41G 3/06; F41G 3/00; F41G 3/02; F41G 3/14; F41J 9/02; F41J 9/08; G06Q 10/087; G06Q 10/0875
USPC .............. 235/414, 413, 411, 412, 400, 404; 342/62, 357.2, 361
See application file for complete search history.

(56) References Cited

U.S. PATENT DOCUMENTS

| | | | |
|---|---|---|---|
| 3,123,825 A | 3/1964 | Bolie | |
| 3,832,711 A | 8/1974 | Grant et al. | |
| 5,099,246 A | 3/1992 | Skagerlund | |
| 5,239,309 A | 8/1993 | Tang et al. | |
| 5,442,362 A * | 8/1995 | Zwarts | G01S 13/10 342/197 |
| 5,478,028 A | 12/1995 | Snyder | |
| 5,917,442 A * | 6/1999 | Manoogian | F41G 7/008 342/75 |
| 6,825,792 B1 * | 11/2004 | Letovsky | F41H 13/00 342/13 |

(Continued)

*Primary Examiner* — Edwyn Labaze
(74) *Attorney, Agent, or Firm* — KPIP Law, PLLC; Gary McFaline

(57) ABSTRACT

A narrow band antenna is configured to guide a munition toward a target location during a flight of the munition from a launch location toward the target location. The antenna has a first mode of operation operable during a first portion of the flight at a first bandwidth, and a second mode of operation operable during a second portion of the flight at a second bandwidth, the second bandwidth being a harmonic of the first bandwidth, and may be a third harmonic of the first bandwidth. The method includes transmitting a target location information to the munition in the first bandwidth during the first portion of the flight and then transmitting the target location information to the munition in the second bandwidth during the second portion of the flight. The first band may be X-band and the second band may be Ka-band.

20 Claims, 5 Drawing Sheets

(56) References Cited

U.S. PATENT DOCUMENTS

| | | | |
|---|---|---|---|
| 7,057,567 B2 | 6/2006 | Koch | |
| 7,183,966 B1* | 2/2007 | Schramek | H01Q 21/28 |
| | | | 342/27 |
| 2005/0020321 A1* | 1/2005 | Rotzoll | H04W 52/0293 |
| | | | 455/343.1 |
| 2006/0090662 A1* | 5/2006 | Biggs | F42B 12/204 |
| | | | 102/215 |
| 2014/0209678 A1* | 7/2014 | Factor | F41H 13/005 |
| | | | 342/53 |
| 2017/0108319 A1* | 4/2017 | Boiman | H01Q 1/281 |
| 2017/0227572 A1* | 8/2017 | Malvern | G01P 15/097 |
| 2021/0262763 A1* | 8/2021 | Hackel | F41G 7/2286 |

* cited by examiner

NARROW BAND ANTENNA HARMONICS FOR GUIDANCE IN MULTIPLE FREQUENCY BANDS

FIELD OF THE DISCLOSURE

The present disclosure relates to antennas for munition guidance, and more particularly to antenna for munition guidance in multiple frequency bands.

BACKGROUND OF THE DISCLOSURE

Active radar homing is an expensive form of guidance for munitions. The radar range equation is shown in Equation 1 below, where the power returning to the receiving antenna, $P_r$, is expressed as a function of the range.

$$P_r = \frac{P_t G_t A_r \sigma F^4}{(4\pi)^2 R_t^2 R_r^2} \quad \text{Equation 1}$$

Where:
$P_t$ is the transmitter power,
$G_t$ is the gain of the transmitting antenna,
$A_r$ is the effective aperture (area) of the receiving antenna,
$\sigma$ is the radar cross section (or "scattering coefficient") of the target,
F is the pattern propagation factor,
$R_t$ is the distance from the transmitter to the target, and
$R_r$ is the distance from the target to the receiver When the transmitter and the receiver are at the same location ($R_t = R_r$), the term $R_t^2 R_r^2$ can be replaced with $R^4$, where R is the range, as shown in Equation 2 below.

$$P_r = \frac{P_t G_t A_r \sigma F^4}{(4\pi)^2 R^4} \quad \text{Equation 2}$$

Thus, the power required to project the signal to see a target has a relationship of range to the fourth ($R^4$). Accordingly, the received power declines proportionally to the fourth power of the range and received power from distant targets is thus relatively small.

Therefore, to increase the range the radar, this requires an increase of power to the fourth. There are benefits to using higher frequencies such as better accuracy and use of proximity fuses. In order to do this for supersonic munitions the bandwidths need to be in the high Gigahertz (GHz) range (for example, the Ka-Band). However, the drawback of using higher frequencies means more power will be required to generate the signal than lower frequencies. Currently, it is ineffective to use Ka-Band guidance throughout flight because it requires too much power to project the signal far distances. Although it is possible to project lower frequencies long distances, the accuracy is not sufficient for end game (i.e. close to the target) maneuverability.

Wherefore it is an object of the present disclosure to overcome the above-mentioned shortcomings and drawbacks associated with the conventional munition guidance systems.

SUMMARY OF THE DISCLOSURE

One aspect of the present disclosure is a system comprising a narrow band antenna configured to guide a munition toward a target location during a flight of the munition from a launch location toward the target location, the narrow band antenna including a first mode of operation operable during a first portion of the flight, the first mode of operation being at a first bandwidth, and a second mode of operation operable during a second portion of the flight, subsequent to the first portion of the flight, and the second mode of operation being at a second bandwidth that is a harmonic of the first bandwidth.

In one embodiment of the system, the second bandwidth is a third harmonic of the first bandwidth. The first mode of operation can have a lower accuracy than the second mode of operation. In one embodiment, the first bandwidth is X-band such that the antenna transmits at a frequency of approximately 8-12 Gigahertz (GHz) in the first mode of operation, and the second bandwidth is Ka-band such that the antenna transmits at a frequency of approximately 27-40 GHz in the second mode of operation. In some cases, the antenna bandwidth has a frequency of approximately 8-40 GHz for both the first mode of operation and the second mode of operation. The first portion of the flight can comprise a first distance, and the second portion of the flight can comprise a second distance. In certain embodiments, the first portion of the flight comprises a first amount of time and the second portion of the flight comprises a second amount of time. In one embodiment the first mode and the second mode of operation transmit and receive using a same transmitter and receiver.

Another aspect of the disclosure is a method for guiding a munition during a flight of the munition from a launch location toward a target location, the method comprising transmitting, by an antenna, a target location information to the munition in a first bandwidth during a first portion of the flight in a first mode of operation of the antenna, and transmitting, by the antenna, the target location information to the munition in a second bandwidth during a second portion of the flight, subsequent to the first portion, in a second mode of operation of the antenna, the second bandwidth being a harmonic of the first bandwidth.

In one embodiment of the method, the method further comprises determining when the first portion is complete and upon determining the first portion is complete, transmitting in the second band for the second portion. In the method, determining when the first portion is complete can be based upon a distance from the launch location. In the method, determining when the first portion is complete can be based upon an amount of time since the munition left the launch location. In the method, the first frequency can comprise the X-band of approximately 8-12 Gigahertz (GHz) and the second frequency can comprise the Ka-band of approximately 27-40 GHz. In some cases, transmitting in the first frequency and transmitting in the second frequency can be performed by a same transmitting element of the antenna.

Another aspect of the disclosure is a self-guiding munition system comprising a narrow-band antenna having a first mode of operation operable at a first bandwidth during a first portion of a flight of the munition, and a second mode of operation operable at a second bandwidth that is a harmonic of the first bandwidth, the second mode of operation operable during a second portion of the flight of the munition, and a processor coupled to the narrow-band antenna and coupled to a memory having instructions for carrying out the first mode of operation and the second mode of operation for the narrow-band antenna. One embodiment is wherein munition is a weapon, a projectile, a ballistic, a bullet, a round, or a guided weapon.

In one embodiment of the munition system, the second bandwidth can be a third harmonic of the first bandwidth. In the system, the first mode of operation can have a lower accuracy than the second mode of operation. Higher frequency typically means narrower beam width, so monopulse or a similar DF algorithm is used then a narrower beam width means higher accuracy. In the system, the first bandwidth can comprise the X-band of approximately 8-12 Gigahertz (GHz) and the second bandwidth can comprise the Ka-band of approximately 27-40 GHz but not in between (e.g., 13-26 GHz). In the method, the antenna bandwidth can have a bandwidth of approximately 8-40 GHz for both the first mode of operation and the second mode of operation. Antennas of the present disclosure are narrow band and tuned for X-Band. However, the system can pick u harmonics of that frequency. Normally, radars filter out the harmonics as "noise" but the system of the present isolates that "noise" while still maintaining a narrow band antenna. In the method, the first portion can comprise a first distance or a first amount of time, and the second portion can comprise a second distance or a second amount of time These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
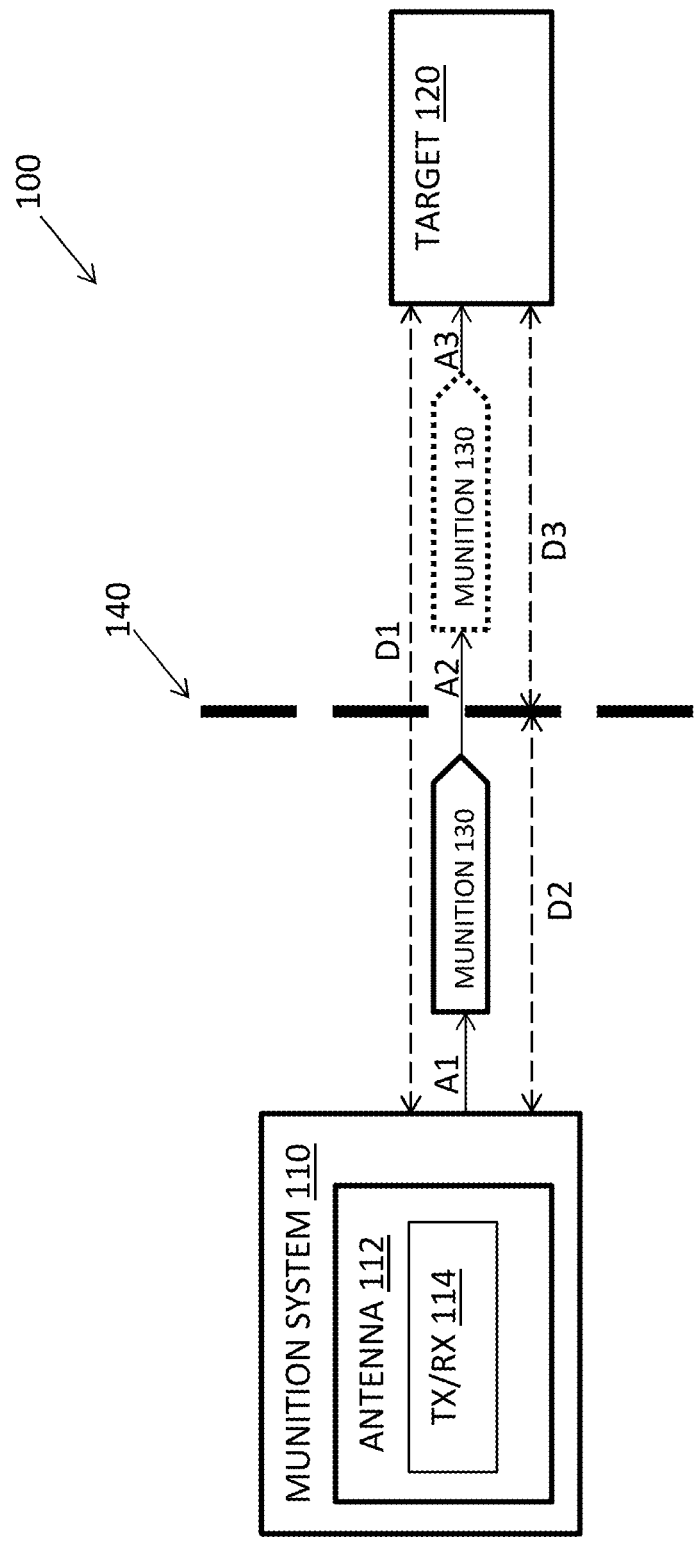
FIG. 1 is a block diagram of a system for guiding a munition toward a target, the system having an antenna with two modes of operation, according to the present disclosure.

A narrow band antenna according to the present disclosure is configured to guide a munition toward a target location (or more generally a "target") during a flight of the munition from a launch location toward the target location. In certain embodiments, "narrow" band refers to hardware that does not need to use multiple converters to cover a target area. For instance, if one is covering about 10 GHz and depending on the intermediate frequency one would need a second set of downconverters to see 13 GHz. So, in this case it is probably +/−10% of the frequency. In one embodiment, the narrow band antenna has a first mode of operation that operates at a first bandwidth during a first portion of the flight of the munition. The first mode of operation is for initial guidance and may, for example, be in the X-band region, which is a generally less accurate band, however, advantageously requires less power to operate. As used herein, accuracy when using Doppler range binning for target acquisition, the X band equates to about a foot and a half of resolution, while the Ka band is about a few inches. Much better target acquisition capability.

As the target gets closer, the system can switch to a second mode of operation for higher accuracy target detection. Depending on the CONOPS, a higher frequency requires more power to broadcast so "close" is based on the system's power as well as maneuverability to hit a target with the added accuracy. In one embodiment, roughly 1 km was assumed based on the tested system's maneuverability and power. The second mode of operation is operable during a second portion of the flight, subsequent to the first portion, and at a second bandwidth that is a harmonic of the first bandwidth. For example, the second bandwidth can be the Ka-band, which is a third harmonic of the X-band, and thus can transmit using a same transmitting element. The antenna can thus transmit using a same transmitting element in both the first mode of operation and the second mode of operation. This advantageously allows a single, narrow band antenna to be used to guide a munition more accurately toward a target, rather than requiring two separate antennas or an expensive broadband antenna to guide the munition in multiple frequency bands.

It is to be understood that it could be any harmonic for atmospheric gain and while the 3rd harmonic is advantageous for guidance, if you are doing something other than radar guidance other harmonics would be beneficial. Furthermore, in certain embodiments system on a chip systems can utilize a single antenna to more accurately guide a munition in software. However, most likely a separate down converter will be used. Accuracy again, is a function of the frequency, the higher the bandwidth the smaller the wave, the more resolution you can achieve in Doppler binning. Also, the narrower the beam width. Standard monopulse has resolution ¹⁄₁₀ the beam width. So as the beam width narrows, the accuracy with the same algorithms improves.

In certain embodiments, the first mode of operation can operate at a first bandwidth, which for example may be in the X-band, having a frequency of approximately 8-12 Gigahertz (GHz). The second mode of operation can operate in the second bandwidth, which for example may be the Ka-band, having a frequency of approximately 27-40 GHz. Thus, the overall operating frequency for the narrow band antenna is approximately 8-40 GHz. Because the second band is operating at a bandwidth that is third harmonic to the first band, both modes of operation can be transmitted using a same transmitting element. A third harmonic is a signal having a frequency that is three times the frequency of its base signal. Thus, for example, the first mode of operation could transmit at 9 GHz (i.e., in the 8-12 GHz range), and the second mode of operation could transmit at approximately three times that, or 27 GHz, using a single transmitting element.

FIG. 1 is a block diagram of a system 100 including a munition system 110 for guiding a munition 130 toward a target 120, the munition system 110 having an antenna 112 with two modes of operation, according to the present disclosure. The antenna 112 includes a transmitter/receiver 114, which may include a separate transmitter element and separate receiver element, or may be a combined transceiver element, as will be appreciated. Any known transmitter/receiver or transceiver element can be implemented. The target 120 is a distance D1 from the munition system 110.

The munition system 110 is configured to implement the two modes of operation such that the first mode of operation is implemented up until a transition point 140, which is at the completion of a first portion of the flight of the munition 130 from the munition system 110 toward the target 110. In the figure, the first portion of the flight is complete at a first distance D2 from the munition system 110, and the second portion of the flight then endures for the second distance D3 from the transition point 140 until the munition reaches the target.

As described herein, the first mode of operation for the first portion of the flight may utilize a less accurate system to generally guide the munition toward the target until it reaches the transition point 140, at which the second mode of operation is initiated that is a more accurate system. This allows the more accurate, and higher power drawing mode, to be transmitted for a shorter period, to consume less power overall. In certain embodiments, the second mode of operation is terminal guidance and in some cases is beads on the maneuverability of the system and the power requirements.

In certain embodiments, the transition point 140 may be a specified distance (D2) away from the munition system 110, may be a specified distance (D3) away from the target 120, or may be set by a predetermined amount of time since the munition 130 has been launched from the munition system 110. The munition system 110 is then configured to implement the second mode of operation during the second portion of the flight D3 to accurately guide the munition toward the target. The munition takes the path of arrows A1, A2, and A3, from the munition system 110, across the transition point 140, and to the target 120.

It is to be understood that the system is applicable to land, sea, and air. It is also understood that the system may be located on a fire control, or munition, system, a platform, or the munition itself.

Figure 2:
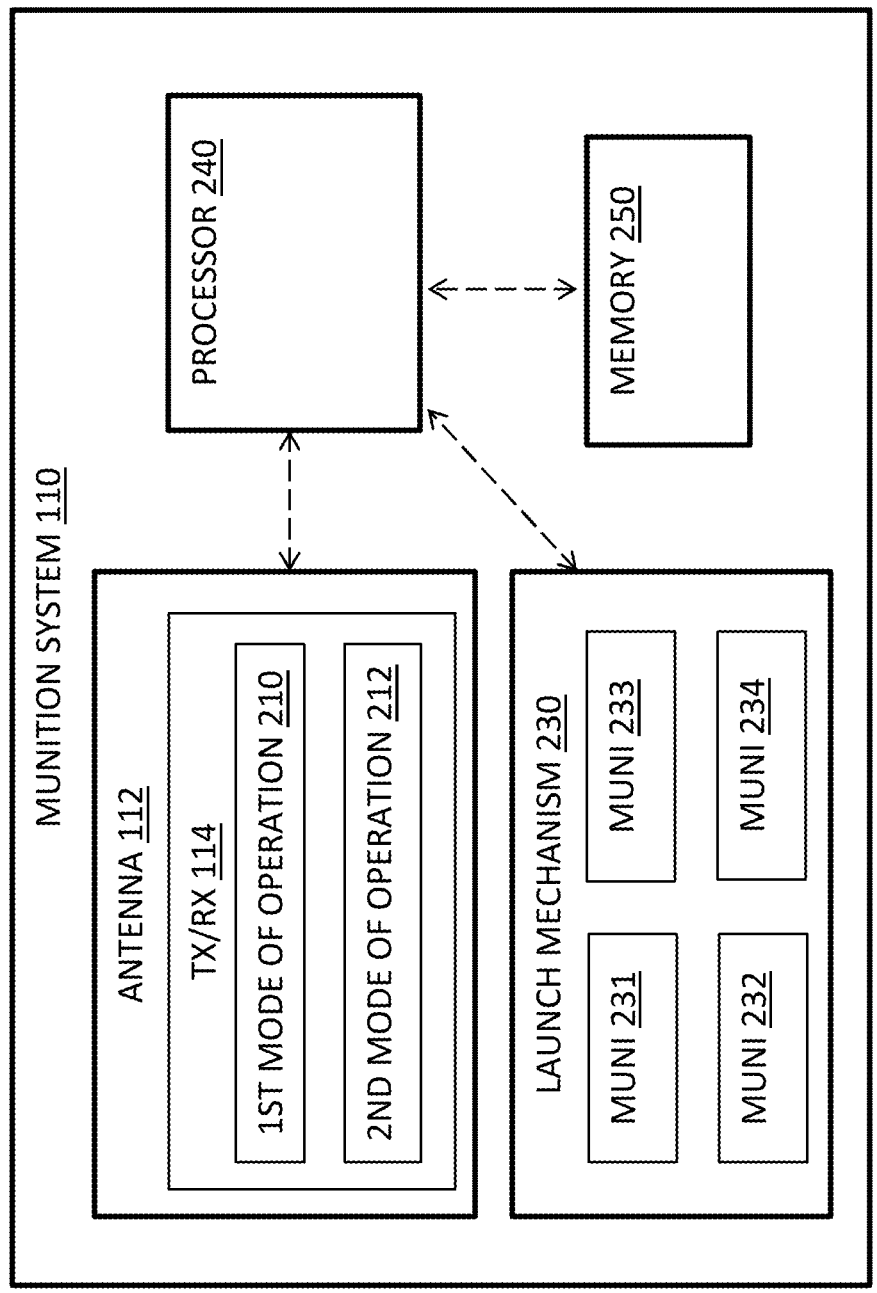
FIG. 2 is a block diagram detailing the components of the munition system, according to the present disclosure.

FIG. 2 is a block diagram detailing the components of the munition system 110, according to the present disclosure. The munition system 110 includes an antenna 112, having a transmitter/receiver 114 that implements a first mode of operation 210 and a second mode of operation 212, according to the present disclosure. The munition system includes a launch mechanism 230 having a plurality of munitions 231, 232, 233, and 234, and a processor 240. The processor 240 is coupled to the antenna 112 to control the two modes of operation, and to the launch mechanism 230 to control launching of the munitions 231, 232, 233, and 234. The processor 240 can be coupled to memory 250 (or may have memory integrally formed as part of the processor). In some instances, the memory and processor may be combined into a microprocessor or microcontroller configured to carry out the instructions stored on the memory 250. The memory 250 may take the form of any acceptable computer readable medium. The munition system 110 may generally be referred to as a "fire control system" in the art. One embodiment is wherein a munition is a weapon, a projectile, a ballistic, a bullet, a round, or a guided weapon.

Figure 3A:
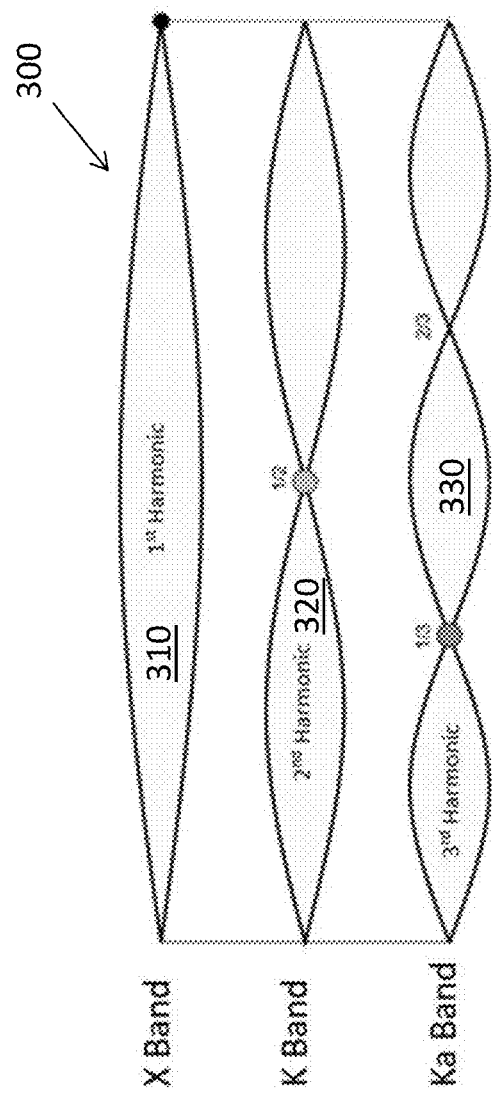
FIG. 3A is a graphical diagram of example bandwidths used in each mode of operation, according to the present disclosure.

FIG. 3A is a graphical diagram 300 of example bandwidths used in each mode of operation, according to the present disclosure. Here, the X-band 310, the K-band 320, and the Ka-band 330 are each shown. The K-band 320 is a second harmonic of the X-band 330, and the Ka-band 330 is third harmonic of the X-band 310. According to the present disclosure, the first mode of operation can implement the X-band 310, and the second mode of operation can implement the Ka-band 330, which is a third harmonic of the X-band. Thus, a same transmitting and/or receiving element can be utilized to guide the munition toward the target in both the first mode of operation and the second mode of operation given that the second mode of operation is a third harmonic of the first mode of operation. And signal modulation on the X-Band 310, is carried to Ka-Band 330. Any modulation that is susceptible to changes in frequency can be compensated for prior to use.

In certain embodiments, the transmission is encrypted but by using a narrow band antenna to get multiple bands of performance it does not necessarily need to be. In one application, the system is used for guidance and hardware is used to capture the harmonic where most broadband antennas and circuits consider bandwidths they do not necessarily need. In certain embodiments, this disclosure describes a less expensive optimized antenna to capture the harmonic(s) and broadcast through it, where most systems would account the harmonics for noise.

Figure 3B:
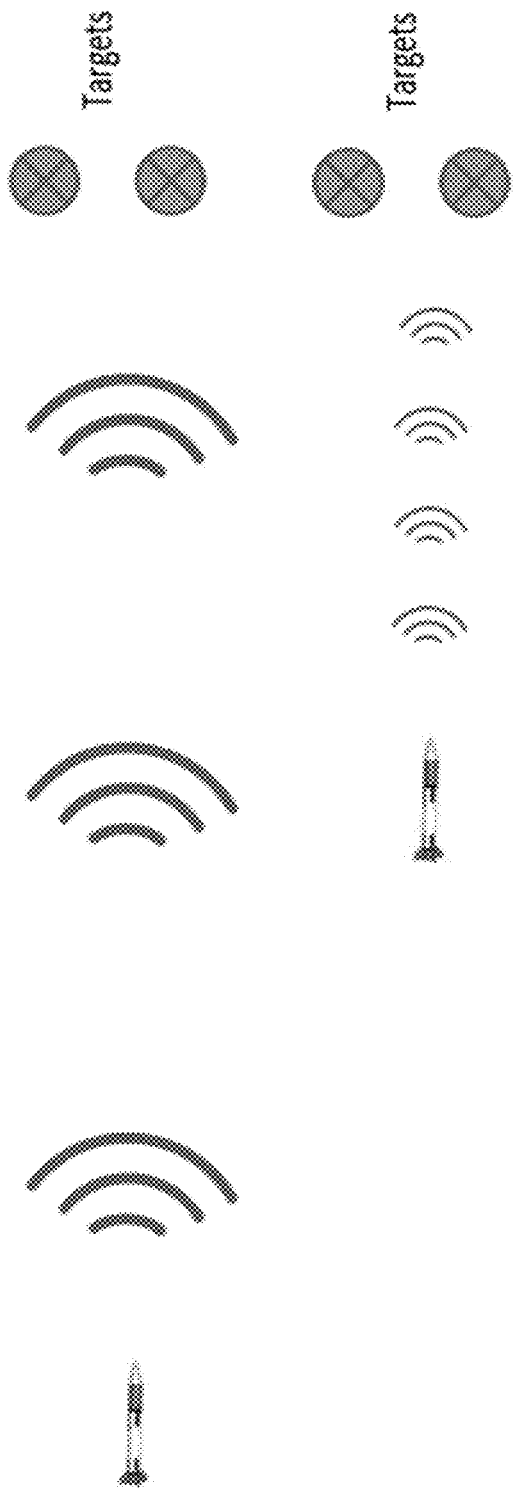
FIG. 3B is a diagrammatical view of one embodiment of a munition system, according to the present disclosure.

Referring to FIG. 3B, a diagrammatical view of one embodiment of a munition system, according to the present disclosure is shown. More specifically, the shorter wavelengths corresponding to the higher frequency can spatially resolve multiple targets (two shown in the illustration,) due to narrower possible beam widths with more accuracy than the lower frequency.

Figure 4:
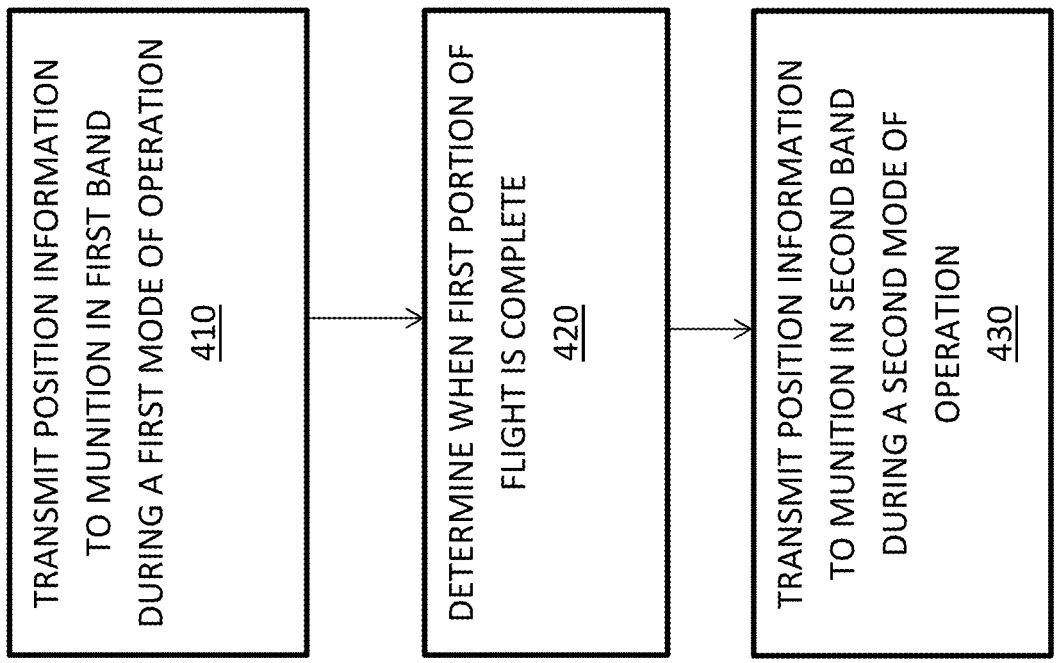
FIG. 4 is a flowchart of one embodiment of a method according to the principles of the present disclosure.

FIG. 4 is a flowchart of one embodiment of a method according to the principles of the present disclosure. The method commences at block 410 by transmitting position information to the munition in a first bandwidth during a first mode of operation such as X, Y, and Z position and velocities. The first mode of operation is for a first portion of the flight of the munition, and for generally guiding the munition toward the target in a low-power, low-accuracy configuration utilizing, for example, the X-band of operation, having a frequency of approximately 8-12 GHz.

At block 420, the method determines when the first portion of the flight is complete. When the first portion of the flight is complete, the antenna is instructed to transition to the second mode of operation for more accurate guidance of the munition toward the target. There are many ways to determine when the first portion of the flight is complete. This can be based on a predetermined distance that the munition is away from the munition system (D2 in FIG. 1), a predetermined distance that the munition is away from the target (D3 in FIG. 1), a percentage of the overall flight from the munition system to the target (D1 in FIG. 1), a predetermined time since the munition has left the munition system, a predetermined amount of time until the munition will reach the target, for example. Other implementations may determine that the system should transition from the first mode of operation to the second mode of operation for other reasons or at another specific time, depending upon the application. In some cases, the use of Doppler gives position and time to go based on the closing velocity.

At block 430, the method transmits the position information to the munition in the second bandwidth during the second mode of operation. The second mode of operation is for the second portion of the flight, when the munition is getting closer toward the target. The second mode of operation is at a higher power consumption and more accurate that the first mode of operation. This allows the first, lower power mode to be implemented when the munition is a greater distance away from the target, while a second, higher power mode can be implemented that is more accurate to guide the munition toward the target as the munition gets closer to the target. The second mode of operation can, for example, operate in the Ka-band, at a frequency of approximately 27-40 GHz.

Although shown and described with respect to a munition system for guiding a munition toward a target, it will be appreciated that the RF techniques herein could be applicable to other RF applications. For example, use as an imaging radar system or scanner. Radar is the main application discussed herein, but if one needs to scan or image something, there is an advantage to seeing smaller details with the same antenna.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A narrow band antenna configured to guide a munition toward a target location during a flight of the munition from a launch location toward the target location, the narrow band antenna comprising:
    a first mode of operation operable during a first portion of the flight, the first mode of operation being at a first bandwidth; and
    a second mode of operation operable during a second portion of the flight, after the first portion of the flight, and the second mode of operation being at a second bandwidth that is a harmonic of the first bandwidth.

2. The narrow band antenna of claim 1, wherein the second bandwidth is a third harmonic of the first bandwidth.

3. The narrow band antenna of claim 1, wherein the first mode of operation has a lower accuracy than the second mode of operation.

4. The narrow band antenna of claim 1, wherein:
    the first bandwidth comprises the X-band such that the antenna transmits at a frequency of approximately 8-12 Gigahertz (GHz) in the first mode of operation; and
    the second bandwidth comprises the Ka-band such that the antenna transmits at a frequency of approximately 27-40 GHz in the second mode of operation.

5. The narrow band antenna of claim 1, wherein the antenna bandwidth has a frequency of approximately 8-40 GHz for both the first mode of operation and the second mode of operation.

6. The narrow band antenna of claim 1, wherein the first portion comprises a first distance, and the second portion comprises a second distance.

7. The narrow band antenna of claim 1, wherein the first portion comprises a first amount of time and the second portion comprises a second amount of time.

8. The narrow band antenna of claim 1, wherein the first mode and the second mode transmit and receive using a same transmitter and receiver.

9. A method for guiding a munition during a flight of the munition from a launch location toward a target location, the method comprising:
    transmitting, by an antenna, a target location information to the munition in a first bandwidth during a first portion of the flight in a first mode of operation of the antenna; and
    transmitting, by the antenna, the target location information to the munition in a second bandwidth during a second portion of the flight, subsequent to the first portion, in a second mode of operation of the antenna, the second bandwidth being a harmonic of the first bandwidth.

10. The method of claim 9, further comprising determining when the first portion is complete and upon determining the first portion is complete, transmitting in the second band.

11. The method of claim 10, wherein determining when the first portion is complete is based upon a distance from the launch location.

12. The method of claim 10, wherein determining when the first portion is complete is based upon an amount of time since the munition left the launch location.

13. The method of claim 9, wherein the first bandwidth comprises the X-band of approximately 8-12 Gigahertz (GHz) and the second bandwidth comprises the Ka-band of approximately 27-40 GHz.

14. The method of claim 9, wherein transmitting in the first bandwidth and transmitting in the second bandwidth is performed by a same transmitting element of the antenna.

15. A self-guiding munition system comprising:
 a narrow-band antenna having a first mode of operation operable at a first bandwidth during a first portion of a flight of the munition, and a second mode of operation operable at a second bandwidth that is a harmonic of the first bandwidth, the second mode of operation operable during a second portion of the flight of the munition; and
 a processor coupled to the narrow-band antenna and coupled to a memory having instructions for carrying out the first mode of operation and the second mode of operation for the narrow-band antenna.

16. The munition system of claim 15, wherein the second bandwidth is a third harmonic of the first bandwidth.

17. The munition system of claim 15, wherein the first mode of operation has a lower accuracy than the second mode of operation.

18. The munition system of claim 15, wherein the first bandwidth comprises the X-band of approximately 8-12 Gigahertz (GHz) and the second bandwidth comprises the Ka-band of approximately 27-40 GHz.

19. The munition system of claim 15, wherein the antenna bandwidth has a bandwidth of approximately 8-40 GHz for both the first mode of operation and the second mode of operation.

20. The munition system of claim 15, wherein the first portion comprises a first distance or a first amount of time, and the second portion comprises a second distance or a second amount of time.

\* \* \* \* \*